United States Patent [19]
Ho

[11] Patent Number: 5,383,248
[45] Date of Patent: Jan. 24, 1995

[54] STRUCTURE OF DOUBLE-BLADE WIND SHIELDWIPER WITH ARM TO BLADE CONNECTORS

[76] Inventor: Chang S. Y. Ho, No. 2-11, Diing Liau Rd., Long Yuan Vill, Ba Lii Hsiang, Taipei Hsien,

[21] Appl. No.: 22,385

[22] Filed: Feb. 24, 1993

Related U.S. Application Data

[63] Continuation of Ser. No. 677,171, Mar. 29, 1991, abandoned.

[51] Int. Cl.⁶ .............................. B60S 1/40; B60S 1/28
[52] U.S. Cl. .............................. 15/250.32; 15/250.31; 15/250.41; 15/250.42
[58] Field of Search .......... 15/250.42, 250.32, 250.35, 15/250.41, 250.31, 250.36, 250.40

[56] References Cited

U.S. PATENT DOCUMENTS

| | | | |
|---|---|---|---|
| 3,018,500 | 1/1962 | Anderson | 15/250.42 |
| 3,508,942 | 6/1971 | Schlesinger | 15/250.32 |
| 3,922,749 | 12/1975 | Castlemon, Jr. et al. | 15/250.32 |
| 4,180,885 | 1/1980 | Thornton et al. | 15/250.32 |
| 4,195,382 | 4/1080 | Macpherson | 15/250.32 |
| 4,339,839 | 7/1982 | Knights | 15/250.41 |
| 4,628,565 | 12/1986 | Wolters | 15/250.41 |
| 4,649,591 | 3/1987 | Guerard | 15/250.32 |
| 4,657,869 | 11/1977 | Longman et al. | 15/250.32 |

FOREIGN PATENT DOCUMENTS

| | | | |
|---|---|---|---|
| 0053960 | 6/1982 | European Pat. Off. | 15/250.32 |
| 0232598 | 8/1987 | European Pat. Off. | 15/250.41 |
| 3004478 | 8/1981 | Germany | 15/250.41 |
| 8103308 | 11/1981 | WIPO | 15/250.32 |

*Primary Examiner*—Scherbel David A.
*Assistant Examiner*—Gary K. Graham
*Attorney, Agent, or Firm*—Lowe, Price, LeBlanc & Becker

[57] ABSTRACT

A double-blade wind shield wiper, the blade assembly of which comprising a frame assembly for holding two parallel wiper blades. The frame assembly includes a main frame at the middle, two end frames at two opposite ends and two intermediate frames set therebetween which are respectively connected into shape by conning pins and spring plates. The frame assembly has vent holes and bevel strips for guiding air stream to force wiper blades to firmly attach to wind shield glass. An adapter is fastened in frame assembly to match with a connector for connecting the blade assembly to a wiper drive arm.

4 Claims, 8 Drawing Sheets

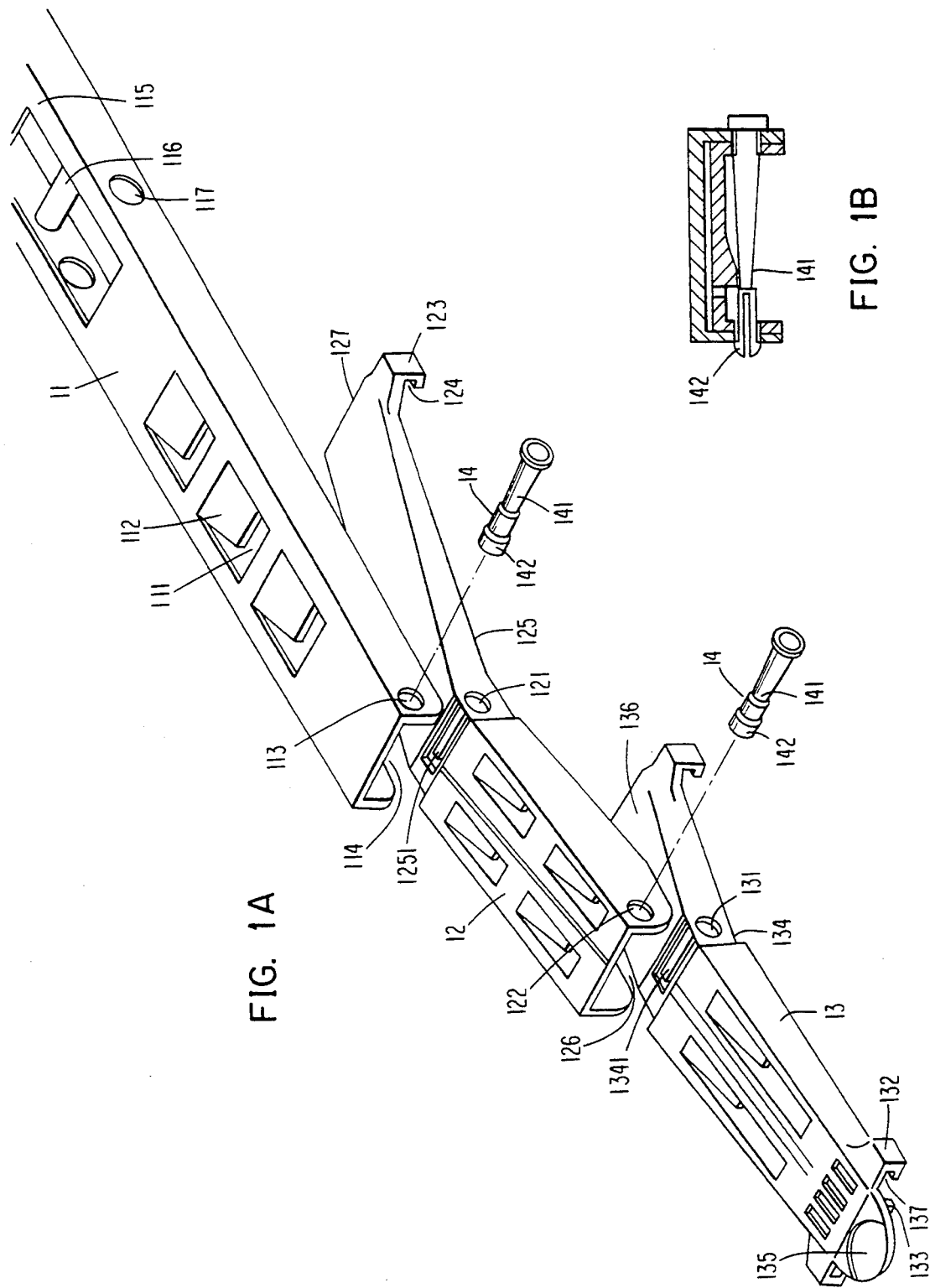

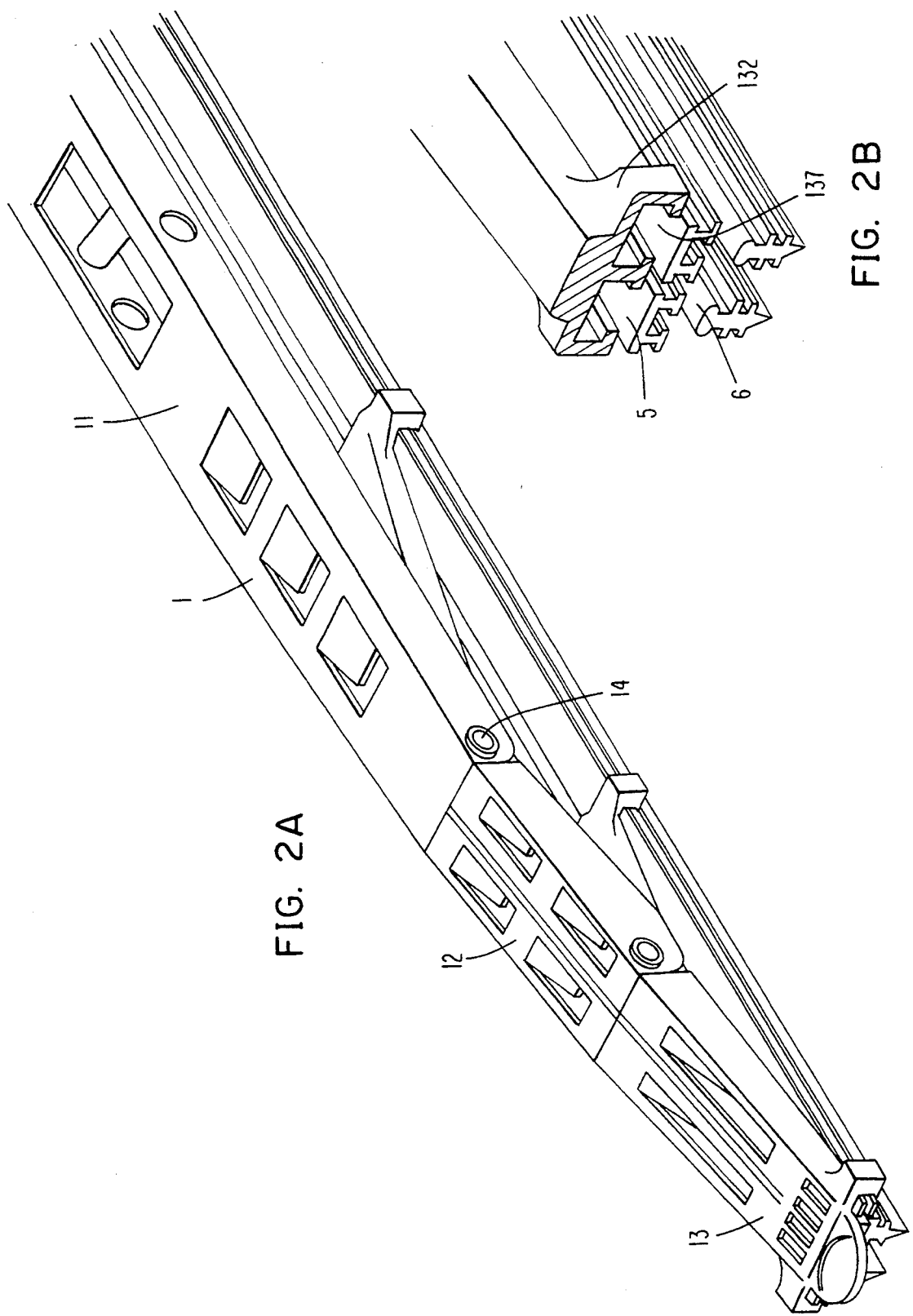

STRUCTURE OF DOUBLE-BLADE WIND SHIELDWIPER WITH ARM TO BLADE CONNECTORS

This application is a continuation of application Ser. No. 07/677,171 filed Mar. 29, 1991, now abandoned.

BACKGROUND OF THE INVENTION

The present invention relates to wind shield wipers and relates more particularly to a double-blade wind shield wiper which is easy to assemble and practical in use.

Various types of wind shield wipers have been disclosed for removing rainwater from vehicle wind shield glass. In regular double-blade wind shield wipers, wiper blades are forced by the frame of the blade assembly to closely attach to wind shield glass. Because wind shield glass generally has a curved outer surface, gap may arise between wind shield glass and wiper blades during wiping operation. Further, regular double-blade wind shield wipers are generally complicated to assemble or dismantle and, expensive to manufacture. During operation, the mechanical parts may be damaged or dislocated easily. Another disadvantage of conventional double-blade wind shield wipers is that each blade assembly must be matched with a specific model of wiper drive arm, the blade assembly from one company can not be attached to the wiper drive arm from another company.

SUMMARY OF THE INVENTION

The present invention has been accomplished to eliminate the aforesaid problems. It is therefore an object of the present invention to provide a double-blade wind shield wiper which is adapted to closely attached to wind shield glass for performing wiping operation effectively. It is another object of the present invention to provide a double-blade wind shield wiper which is easy to assemble and dismantle. It is still another object of the present invention to provide a double-blade wind shield wiper which can be conveniently adjusted to fit all types of wiper drive arm.

According to a first aspect of the present invention, there is provided a wind shield wiper which is generally comprised of a frame assembly for holding two parallel wiper blades. The frame assembly includes a main frame at the middle, two intermediate frames connected at the two opposite ends of said main frame, and two end frames connected at the two opposite ends of said intermediate frames. The main frame has vent holes and bevel strips for guiding air current which gives pressure to force the blades to firmly attach to wind shield glass during wiping operation.

According to another aspect of the present invention, there is provided a wind shield wiper which is generally comprised of a frame assembly for holding two parallel wiper blades. The frame assembly is comprised of a main frame at the middle, two end frames at two opposite ends and two intermediate frames set therebetween. Connection between the main, intermediate and end frames is achieved by fastening connecting pins in respective pin holes. Each connecting pin has a flange stopped at the outside the frame assembly, and a tapered surface portion at the middle firmly retained in locking position by a clamping plate.

According to still another aspect of the present invention, there is provided a wind shield wiper which is generally comprised of a frame assembly for holding two parallel wiper blades. The frame assembly has a wiper drive arm connecting hole for mounting an adapter which is designed to fit the shape of said wiper drive arm connecting hole. A connector provided for connecting either type of wiper drive arm to the adapter which is firmly set in the frame assembly. By adjusting the connector, the frame assembly can be conveniently alternatively attached to all kinds of wiper drive arms.

BRIEF DESCRIPTION OF THE DRAWINGS

FIG. 1A is a partly perspective dismantled view of the frame assembly of the wiper blade assembly of the wind shield wiper according to the present invention;

FIG. 1B is a cross-sectional view illustrating the positioning of a connecting pin in the frame assembly thereof;

FIG. 2A is a partly perspective assembly view of the frame assembly thereof;

FIG. 2B is a schematic drawing showing the relative positioning of the elongated clamping plates in the grooves of the hook at one end of an end frame for holding wiper blades;

DETAILED DESCRIPTION OF THE PREFERRED EMBODIMENT

Figure 3A:
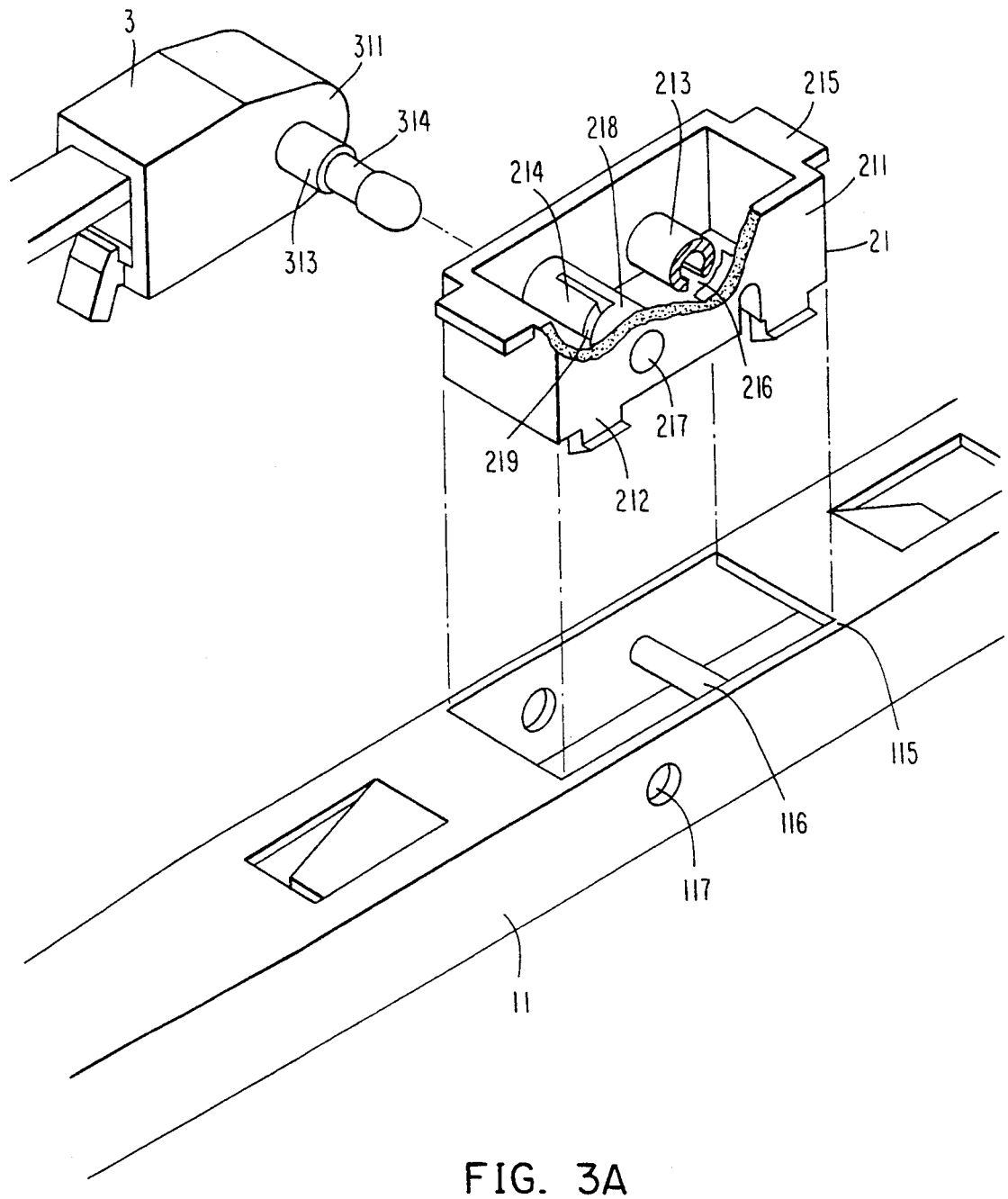
FIG. 3A is a perspective dismantled view of the main frame, the adapter and the connector.

Referring to the annexed drawings in detail, a double-blade wind shield wiper in accordance with present invention is generally comprised of a blade assembly 1, an adapter 2, a connector 3 and a drive arm 4.

Referring to FIGS. 1A, 1B, 2A and 2B, blade assembly 1 includes a frame assembly for holding wiper blades 6, comprised of a main frame 11, two intermediate frames 12 respectively longitudinally connected to said main frame 11 at two opposite ends, two end frames 13 respectively longitudinally connected to said intermediate frames 12 at two opposite ends, and a plurality of connecting pins 14 to respectively secure said end frames 13 to said intermediate frames 12 or said intermediate frames 12 to said main frame 11. Main frame 11 has a plurality of vent holes 111 longitudinally disposed on the top thereof, a plurality of bevel strips 112 respectively obliquely extending downward from said vent holes 111 at one end, and two pin holes 113 at the two opposite ends 114 thereof. Intermediate frame 12 has a main frame connecting portion 125 at the middle, a first pin hole 121 on said main frame connecting portion 125, a second pin hole 122 on the front end 126 thereof, a spring plate 1251 on said main frame connecting portion 125 at the top, and a unitary hook member 123 at the rear end 127 thereof which has two grooves 124 on the inside. End frame 13 has an intermediate frame connecting portion 134 at the middle with a pin hole 131 transversely made thereon, a spring plate 1341 on said intermediate frame connecting portion 134 at the top, two unitary hook members 132 at the front and rear ends 135 and 136 thereof which have each two grooves 137 on the inside, and a stop plate 133 vertically extending downward from said front end 135. Connecting pin 14 has a tapered surface portion 141 at the middle and a flange 142 at one end. The main, intermediate and end frames are connected into a frame assembly in process outlined hereinafter. Connect the two opposite ends 114 of the main frame 11 to the main frame connecting portion 125 of each intermediate frame 12 permitting the pin holes 113 of the main frame 11 to respectively aligned with the first pin hole 121 of each intermediate frame 12 for inserting a connecting pin 14. The connecting pin 14 which is fastened in the first pin hole 121 of each intermediate frame 12 and the pin hole 113 at either end of the main frame 11 is retained by the spring plate 1251 on each intermediate frame 12. By means of the effect of the flange 142 of the connecting pin 14 and the spring plate 1251, each intermediate frame 12 is pivotably secured to either end of the main frame 11. Then, the two end frames 13 are respectively connected to the two intermediate frames 12 in the same manner. The front end 126 of each intermediate frame 12 is mounted on the connecting portion 134 of the corresponding end frame 13 permitting the pin hole 122 of the intermediate frame 12 to be aligned with the pin hole 131 of the end frame 13 so that a connecting pin 14 can be inserted to secure them together. Two elongated clamping plates 5 are then fastened in parallel in the two grooves 124 of the hook 123 of the rear end 127 of each intermediate frame 12 and the two grooves 137 of the front as well as rear end 135 and 136 of each end frame 13 for holding two wiper blades 6. After assembly, the two wiper blades 6 have each two opposite ends respectively stopped at the stop plate 133 of each end frame 13. Mounting of the elongated clamping plates 5 in the frame assembly of the blade assembly 1 is quite simple. By bending the frame assembly into a slightly curved shape, the two opposite ends of each elongated clamping plate 5 can be conveniently inserted in the grooves 124 and 137 of the two intermediate frames 12 and the two end frames 13 at the two opposite ends of the main frame 11. As indicated, the main frame 11 has vent holes 111 and bevel strips 112 which are provided for passing therethrough of air current. Because of this special design, wind resistance is greatly reduced from the wind shield wiper and the wind shield wiper can be closely attached to vehicle's window glass.

Figure 7A:
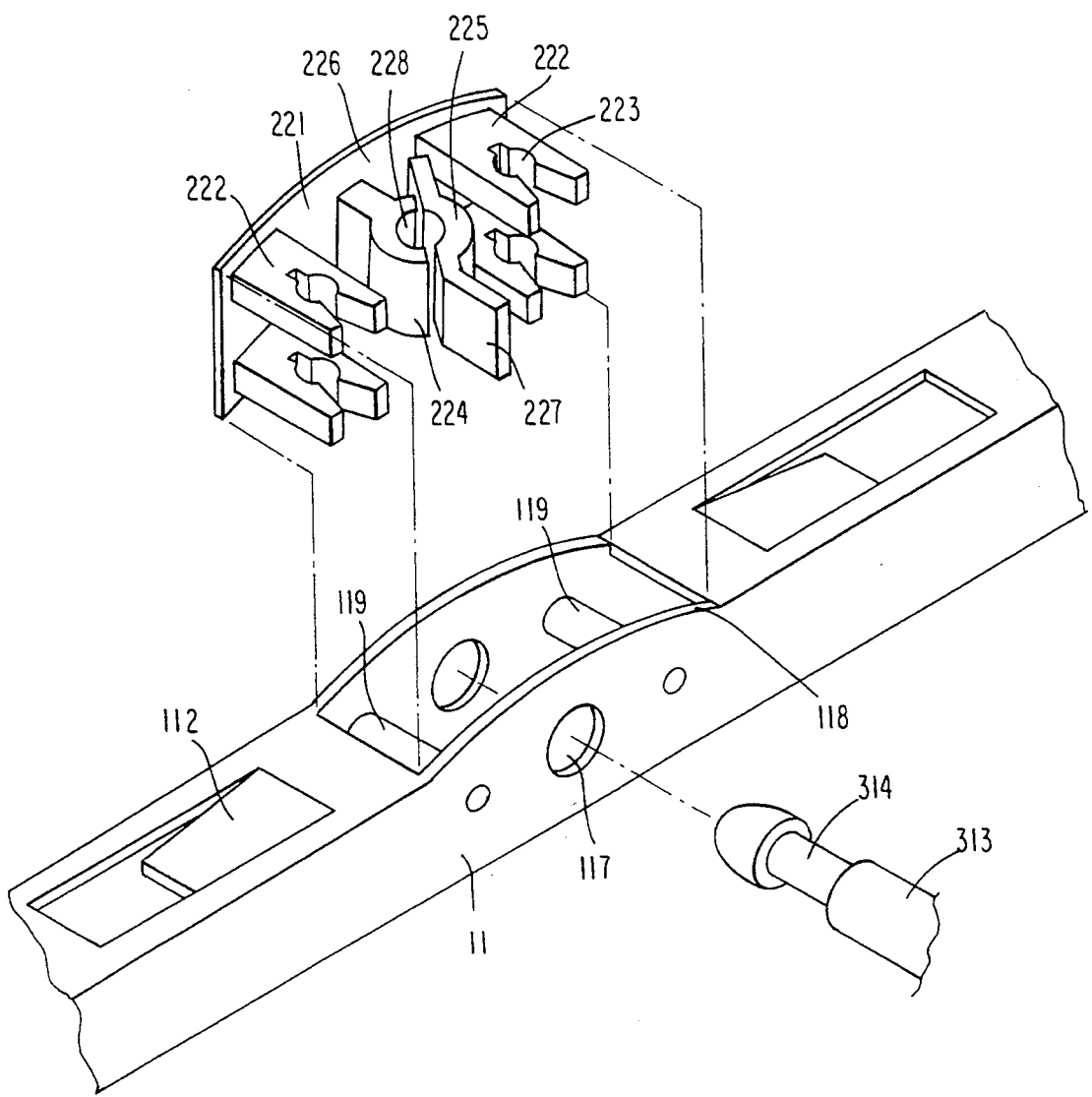
FIG. 7A illustrates an alternate form of the adapter and the main frame.

Two different types of adapters 2 may be used according to the structure of the main frame 11. FIG. 3A illustrates an adapter 21 for use to match with the main frame 11 which has a flat top edge 115 on the drive arm connecting hole thereof and a single cross rod 116 inside said drive arm connecting hole. FIG. 7A illustrates an alternate form of adapter 22 for use to match with the main frame 11 which has a circular top edge 118 on the drive arm connecting hole thereof and two cross rods 119 inside said drive arm connecting hole.

Figure 3B:
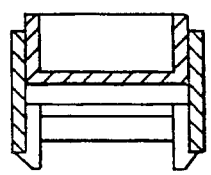
FIG. 3B is a schematic plan view showing the connection between the first cross bar of the adapter with the cross rod of the main frame.
Figure 3C:
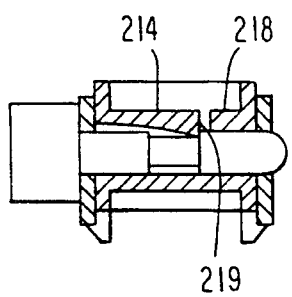
FIG. 3C is a schematic plan view showing the connection between the connector, the adapter and the main frame.

Referring to FIGS. 3A, 3B and 3C, adapter 21 is generally comprised of a casing 211 fitting the shape of the drive arm connecting hole of the main frame 11, having two projecting strips 215 transversely extending outwards therefrom at the two opposite ends thereof at the top, a plurality of unitary hooks 212 around the bottom edge thereof, a first cross bar 213 and a second cross bar 214 made at the inside, wherein the first cross bar 213 is a hollow tube having an elongated opening 216 longitudinally made thereon at the bottom; the second cross bar 214 has a boring bore 217 through the central axis thereof and a spring plate 218 on the outside which has a raised portion 219 at the top. When the casing 211 is inserted in the drive arm connecting hole of the main frame 11, the cross rod 116 of the main frame 11 is engaged in the elongated opening 216 of the first cross bar 213, the hooks 212 of the casing 211 are respectively hooked in the bottom edge of the main frame 11, and the two projecting strips 215 of the casing 211 are respectively stopped at the top edge of the drive arm mounting hole at two opposite ends, permitting the boring bore 217 of the second cross bar 214 to align with the pin hole 117 which is transversely made on the main frame 11 at the middle.

Figure 7B:
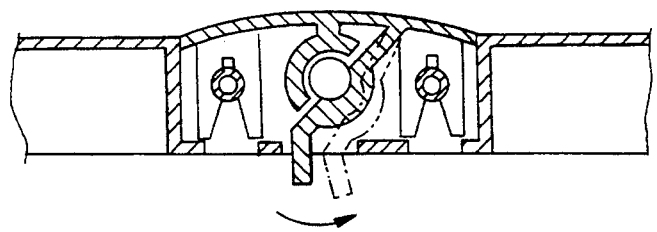
FIG. 7B is a schematic plan view showing the connection of the adapter and the main frame indicated in FIG. 7A.

Referring to FIGS. 7A and 7B, adapter 22 comprises a top plate 221 having a plurality of unitary, clamping jaws 222 vertically extending therefrom at two opposite ends at locations corresponding to the two cross rods 119 of the main frame 11, which clamping jaws 222 have each a clamping hole 223 on the terminal end thereof, and a flexible clamping jacket 226. The flexible clamping jacket 226 is comprised of two semi-circular parts 224 and 225 defining therein a flexible mounting hole 228, wherein the first semi-circular part 224 is terminating in an end board 227.

Figure 4A:
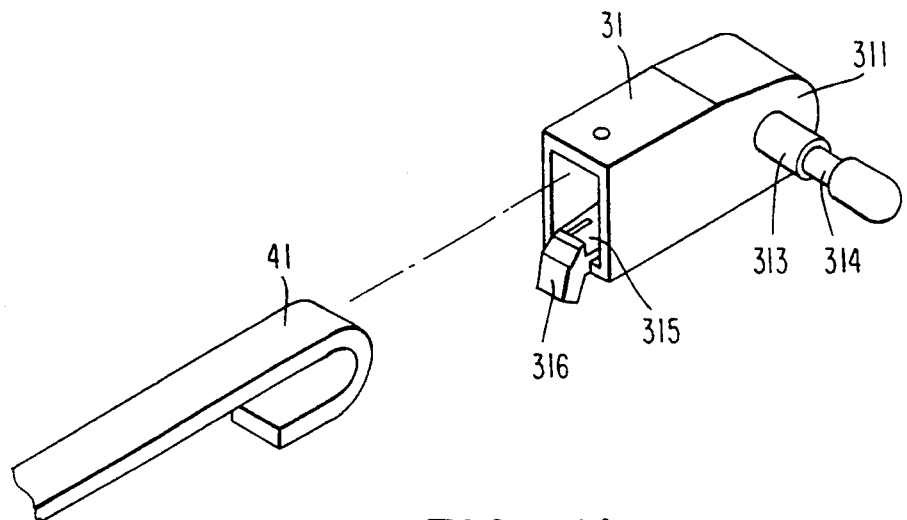
FIGS. 4A, 4B and 4C illustrate that an U-shaped wiper drive arm is directly connected to the casing of the connector.
Figure 4B:
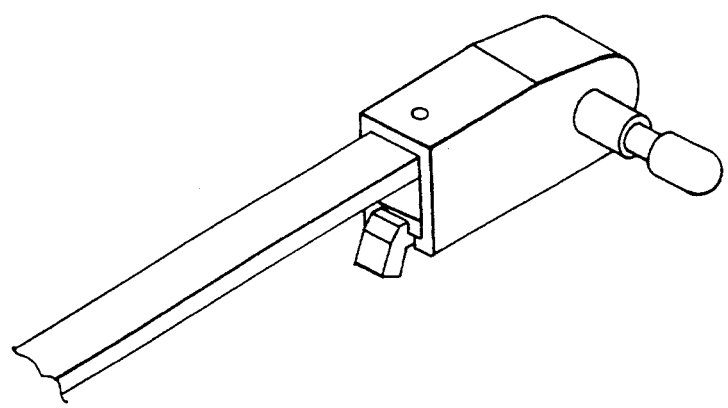
Figure 4C:
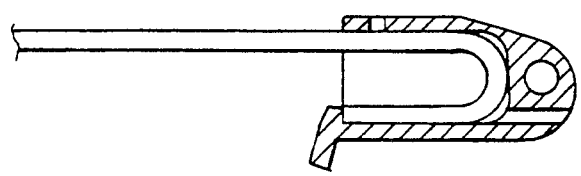
Figure 5A:
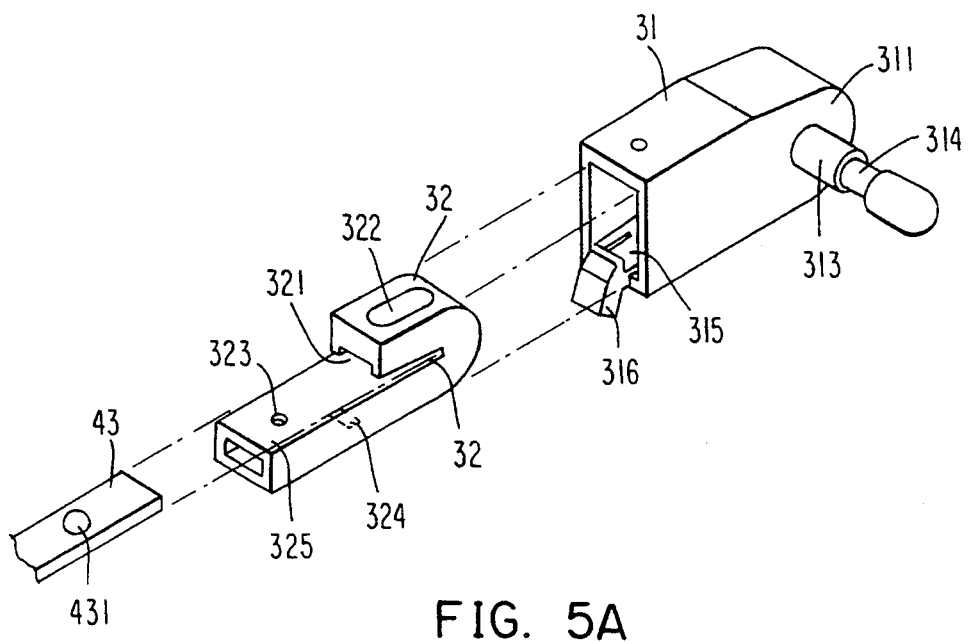
FIGS. 5A, 5B and 5C illustrate that a flat wiper drive arm which has a raised portion on the connecting end thereof is connected to the casing of the connector by the U-shaped square tube.
Figure 5B:
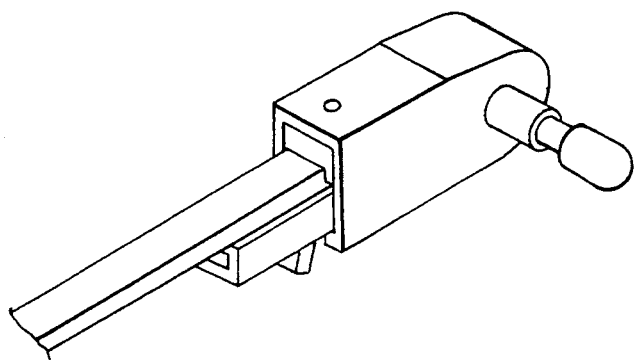
Figure 5C:
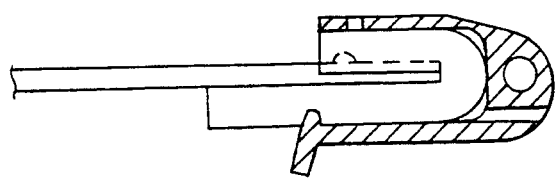
Figure 6A:
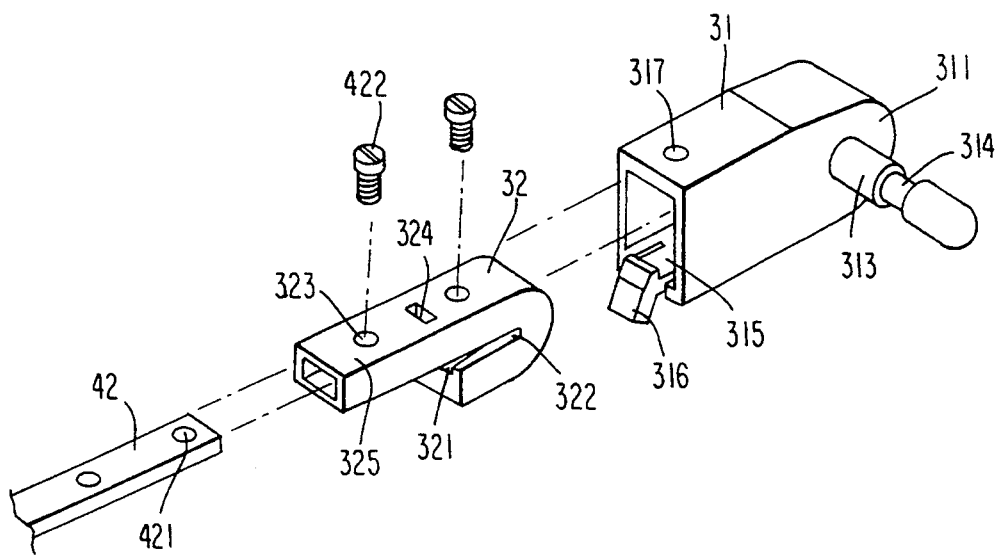
FIGS. 6A, 6B and 6C illustrate that a flat wiper drive arm which has bolt holes on the connecting end thereof is connected to the casing of the connector by the U-shaped square tube.
Figure 6B:
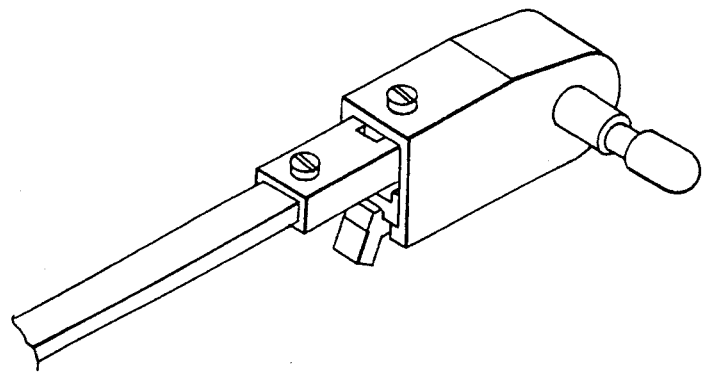
Figure 6C:
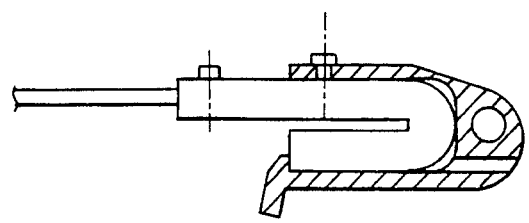

Referring to FIGS. 4A, 4B, 4C, 5A, 5B, 5C, 6A, 6B and 6C, connector 3 is provided to connect a wiper blade assembly 1 to the adapter 2 fastened in the main frame 11 of the wiper blade assembly 1, and generally comprised of a casing 31 and a resilient, U-shaped square tube 32. The casing 31 has a forked, circular front end 211, a pivot 313 on said front end 211 at one side which has an annular groove 314 near the terminal end thereof, hole 317 at the top of the hollow rear end thereof, and a spring plate 315 extending from said hollow rear end which has a hooked portion 316 at the rear end thereof. The resilient, U-shaped square tube 32 has an opening 321 at one end, an elongated slot 322 connecting with said opening 321, and an extension 325 at an opposite end which has a series of holes 323 and a fastening slot 324 respectively made thereon at suitable locations. Wiper drive arm 4 may be variously embodied. In FIGS. 4A, 4B and 4C there is illustrated an U-shaped wiper drive arm 41; in FIGS. 5A, 5B and 5C there is illustrates another form of wiper drive arm 43 which has a raised portion 431 on near the connecting end thereof; in FIGS. 6A, 6B and 6C there is illustrated still another form of wiper drive arm 42 which has a plurality of bolt holes 421 for connection.

Referring to FIGS. 4A, 4B and 4C again, the U-shaped connecting end of the U-shaped wiper drive arm 41 is directly inserted in the casing 31 of the connector 3 to hook up with the hooked portion 316 of the spring plate 315. In this connection, the U-shaped square tube 32 is eliminated. Referring to FIGS. 5A, 5B and 5C again, the flat connecting end of the wiper drive arm 43 is inserted in the opening 321 of the U-shaped square tube 32 with the raised portion 431 thereof engaged in the elongated slot 322 of the U-shaped square tube 32, and then, the U-shaped square tube 32 is squeezed inwards and inserted in the casing 31 permitting the hooked portion 316 of the spring plate 315 to hook in the fastening slot 324. Therefore, the opening 321 is squeezed inwards to firmly retain the wiper drive arm 43 therein. Referring to FIGS. 6A, 6B and 6C again, the wiper drive arm 42 is inserted in the extension 325 of the U-shaped square tube 32, and then, a screw 422 is fastened through the one of the holes 323 into the corresponding bolt hole 421 on the wiper drive arm 42 to connect the wiper drive arm 42 and the U-shaped square tube 32 together. Then, the U-shaped square tube 32 is inserted in the casing 31 permitting the hooked portion 316 of the spring plate to hook in the fastening slot 324. And finally, fasten a screw 422 from the hole 317 on the casing 3 into the corresponding hole 323 on the U-shaped square tube 32 and the corresponding bolt hole 421 on the wiper drive arm 42 to firmly secure the wiper drive arm 42, the U-shaped square tube 32 and the casing 31 together. When the hooked portion 316 of the spring plate 315 is bent outwards to disengage from the fastening slot 324 of the U-shaped square tube 32, wiper drive arm 4 can be conveniently detached from the connector 3. After the wiper drive arm 41, 42 or 43 is connected to the connector 3, the pivot 313 of the casing 31 of the connector 3 is inserted in the pin hole 117 of the main frame 11 and the boring bore 217 of the adapter 21 or the mounting hole 218 of the adapter 22. Thus, the wiper drive arm is firmly connected to the main frame 11.

What is claimed is:

1. A double-bladed windshield wiper comprising an elongated blade assembly having an adapter connected thereto, an elongated wiper drive arm, and a connector connecting said adapter to said wiper drive arm, wherein:

said blade assembly comprises an elongated central main frame, two elongated intermediate frames respectively connected to said main frame at opposite ends thereof, each of said intermediate frames having a first end extending outwardly from said main frame and a second end disposed adjacent said main frame, an elongated end frame respectively connected to each of said intermediate frames, each of said end frames having a first end extending outwardly from the first end of each of said intermediate frames and a second end disposed adjacent each of said intermediate frames, said main frame having a pair of aligned apertures disposed at each end thereof, each of said intermediate frames having two pairs of aligned apertures, one pair being disposed at the first end thereof and each of said end frames having a pair of aligned apertures, the apertures in said end frames being in registry with the apertures at the first end of its respective intermediate frame, and the other pair of apertures in each of said intermediate frames being in registry with the apertures at its respective adjacent end of said main frame, a connecting pin extending through each of said pairs of aligned and registered apertures to interconnect said frames, and a spring plate coupled to said frames such as to retain each of said connecting pins in its respective apertures, two elongated clamping plates, mounted in parallel on said assembly, connecting said intermediate and end frames, said clamping plates depending from said frames and each defining a longitudinal groove, and a wiper blade disposed in each said clamping plate groove; said main frame being generally U-shaped in transverse cross section having spaced sidewalls and a web interconnecting said sidewalls, said frame having a plurality of elongated vent holes disposed longitudinally therealong in said web, a bevel strip extending obliquely from said main frame to a region below each vent hole, each of said intermediate frames having a main frame connecting portion located midway between the ends thereof, and a unitary hook member at the rear end thereof with two parallel grooves formed therein, each of said end frames having an intermediate frame connecting portion located midway between the ends thereof, unitary hook members disposed at each end of said end frames with each hook member having two parallel grooves respectively formed therein, and a stop plate vertically extending downward from said first end of each end frame;

said adapter comprising a rectangular casing formed by a pair of vertical parallel sidewalls coupled with a pair of vertical, parallel end walls, the sidewalls being perpendicular to the end walls, and all of said walls together defining a top and bottom edge of said casing, a projecting strip extending laterally from each end wall at the top edge and unitary hooks extending from each sidewall at the bottom edge, said hooks coupling the casing with the central main frame, a first and second cross bar extending between and connected with the sidewalls, said first cross bar having an elongated longitudinal opening, said second cross bar having a bore through the central axis thereof and a portion of said second cross bar forming a spring plate with a raised portion adjacent the bore;

said connector comprising a hollow housing and a resilient, elongated, U-shaped square tube member coupled together, said housing having an arcuate front end and an open rear end, said arcuate front end having a pivot pin extending outwardly from a side thereof to a free end, said pivot pin having an annular groove adjacent the free end thereof;

said adapter having an aperture therein in registration with the bore in said second cross bar so that when said pivot pin is received through said aperture extending into the bore in said second crossbar, said pin is retained by engagement of the annular groove with the spring plate, the open rear end of said housing mounting a spring plate therein with a hook on the distal portion thereof for engaging said U-shaped tube when one end of said tube member is received in said housing through the open rear end; and said wiper drive arm is coupled to the end of said U-shaped tube member opposite the end received in the open end of said housing which is retained therein by said hook.

2. The double-bladed windshield wiper of claim 1 wherein said main frame ends are respectively connected to said main frame connecting portion of said intermediate frames and the first end of each intermediate frame is connected to the connecting portion of the corresponding end frame so that said wiper blade assembly is slightly curved whereby the two opposite ends of each elongated clamping plate are inserted in the grooves of said intermediate frames and said end frames to hold said two wiper blades.

3. The double-bladed windshield wiper of claim 1, wherein said wiper drive arm has a flat connecting end received in a leg of the U-shaped tube member.

4. The double-bladed windshield wiper of claim 3 further comprising screw fastener means for fastening wiper drive arm with said U-shaped tube member.

* * * * *